(12) United States Patent
Baller et al.

(10) Patent No.: US 8,961,906 B2
(45) Date of Patent: Feb. 24, 2015

(54) FLUID CONNECTOR DEVICES AND METHODS OF MAKING AND USING THE SAME

(75) Inventors: Marko Klaus Baller, Saarbruecken (DE); Victor Donald Samper, Munich (DE); Christian Rensch, Munich (DE)

(73) Assignee: General Electric Company, Niskayuna, NY (US)

( * ) Notice: Subject to any disclaimer, the term of this patent is extended or adjusted under 35 U.S.C. 154(b) by 417 days.

(21) Appl. No.: 12/844,385

(22) Filed: Jul. 27, 2010

(65) Prior Publication Data

US 2012/0025521 A1 Feb. 2, 2012

(51) Int. Cl.
*B01L 3/00* (2006.01)
*F16L 25/00* (2006.01)
*B01J 19/00* (2006.01)
*B01L 9/00* (2006.01)

(52) U.S. Cl.
CPC ....... B01L 3/502715 (2013.01); B01J 19/0093 (2013.01); *B01J 2219/00806* (2013.01); *B01J 2219/00813* (2013.01); *B01L 9/527* (2013.01); *B01L 2200/027* (2013.01); *B01L 2200/0689* (2013.01); *B01L 2300/0861* (2013.01); *B01L 2300/123* (2013.01); *B01L 2300/161* (2013.01)
USPC ....................................................... 422/546

(58) Field of Classification Search
CPC ......................... B01L 3/00–3/02; F16L 25/00
USPC ....................................................... 422/546
See application file for complete search history.

(56) References Cited

U.S. PATENT DOCUMENTS

| | | |
|---|---|---|
| 7,311,882 B1 | 12/2007 | Renzi |
| 2004/0219661 A1 | 11/2004 | Chen et al. |
| 2005/0118068 A1* | 6/2005 | Kahl ............................. 422/100 |
| 2007/0231214 A1* | 10/2007 | Sakaguchi .................... 422/100 |
| 2008/0273918 A1 | 11/2008 | Linder et al. |
| 2009/0236226 A1 | 9/2009 | Yuen |

FOREIGN PATENT DOCUMENTS

| | | |
|---|---|---|
| EP | 1424559 A1 | 6/2004 |
| EP | 2230015 A1 | 9/2010 |
| WO | WO 0188525 A1 * | 11/2001 |
| WO | 03072251 A2 | 9/2003 |
| WO | 2004065288 A1 | 8/2004 |

OTHER PUBLICATIONS

Cam-Lem, Inc. "High-Performance Microfluidics," Mar. 2005. 2 pages.*
Search Report and Written Opinion from corresponding PCT Application No. PCT/US2011/045443 dated Nov. 29, 2011.

* cited by examiner

*Primary Examiner* — Christine T Mui
(74) *Attorney, Agent, or Firm* — Seema S. Katragadda

(57) ABSTRACT

A fluid connector device is provided. The fluid connector device includes a coupling substrate having a conformal recess, a reconnectable fitting disposed in the recess to provide a first passageway, and a force applying element operatively coupled to the reconnectable fitting, or the coupling substrate, or both the reconnectable fitting and the coupling substrate to at least partially provide a sealing force between the reconnectable fitting and the coupling substrate, wherein at least one of the force applying element, the reconnectable fitting, and the coupling substrate comprises one or more degrees of freedom for self alignment of the reconnectable fitting and the conformal recess.

26 Claims, 9 Drawing Sheets

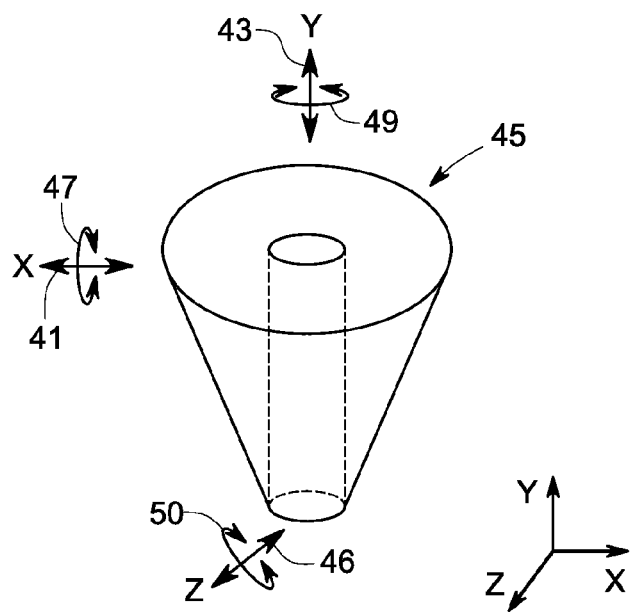
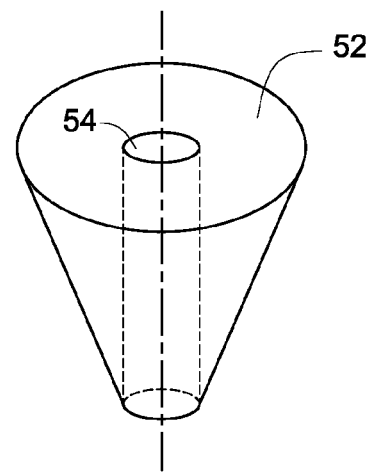
FIG. 3          FIG. 4
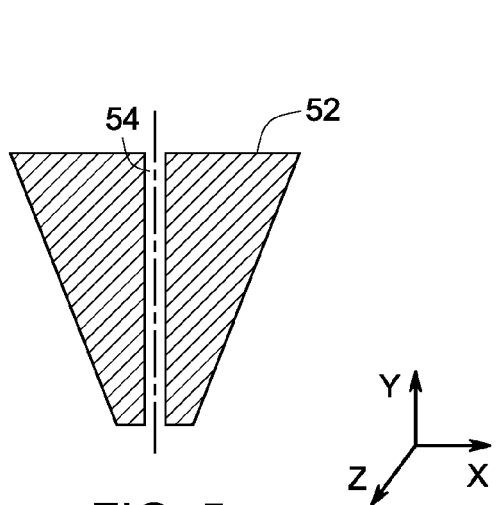
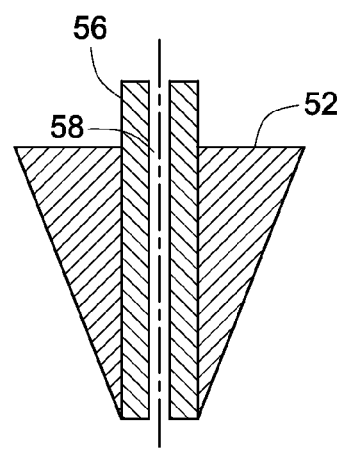
FIG. 5          FIG. 6

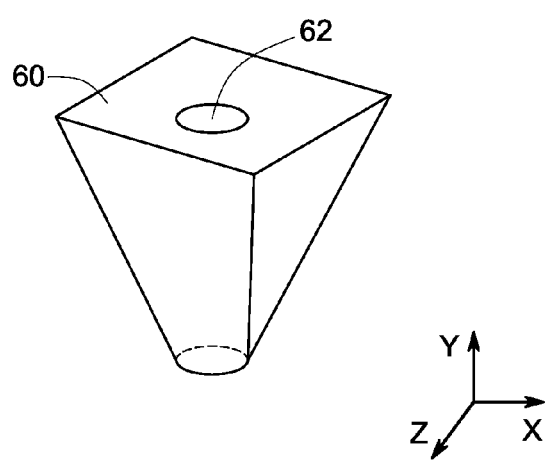
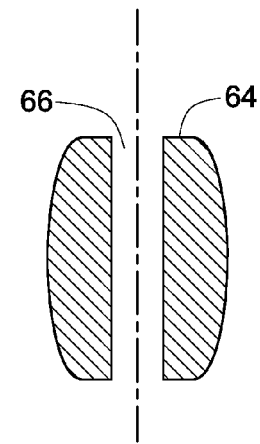
FIG. 7                    FIG. 8
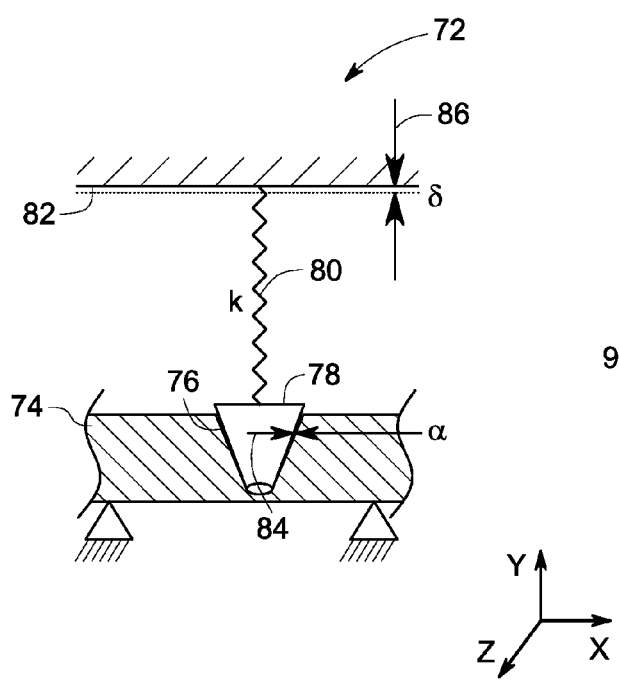
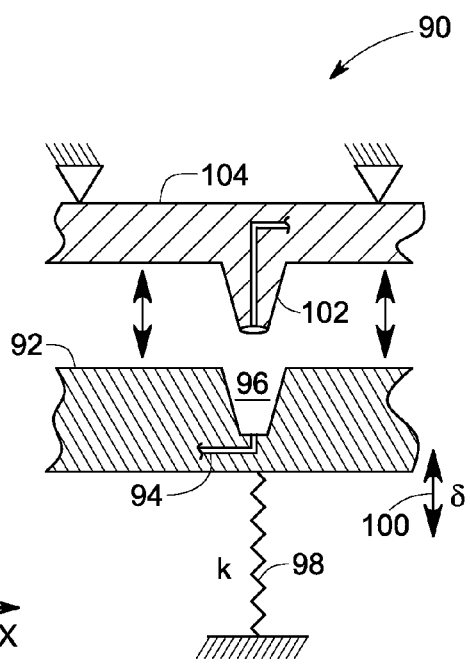
FIG. 9                    FIG. 10

FLUID CONNECTOR DEVICES AND METHODS OF MAKING AND USING THE SAME

BACKGROUND

Embodiments of the invention relate to miniature fluidic devices, such as microfluidic devices, and more particularly, to fluidic connectors for introducing fluids in miniature fluidic devices.

Typically, microfluidic devices employ networks of chambers that are connected by microchannels. The microchannels and chambers may have meso-scale to micro-scale dimensions. Microfluidic devices, when used in analytical applications, offer various advantages, including the ability to use small sample sizes. For example, the sample sizes for the microfluidic devices may be on the order of nano-liters.

Advantageously, the microfluidic devices may be produced at a relatively low cost, and may perform numerous specific operations, including mixing, dispensing, reacting, and detecting. However, introducing fluid samples and reagents into the microfluidic devices is a challenge, especially when multiple inputs are required. For example, in a lab-on-a-chip setting, there is a need to connect the microfluidic chip to input and output interfaces. Connecting the microfluidic chip or connecting the microchannels within the chip to other input and/or output interfaces may pose problems due to small size (typically ranging from a few micrometers in width or diameter to tens or hundreds of micrometers) of the microchannels. In addition, it may be difficult to, for example, align input devices with the small-sized microchannels. Also, some of the input devices, e.g. liquid chromatographs, work at high pressures and it may be difficult to prevent leakage when using such input devices.

A common technique used in the past for interfacing the microfluidic devices to each other and to the outside world involves bonding a length of tubing of the input and/or output devices to a port on the microfluidic device. Usually, the tubing is bonded to the port on the microfluidic device using a suitable adhesive, such as epoxy. However, adhesive bonding is unsuitable for many chemical analysis applications because the solvents used in bonding may introduce impurities in the chemical sample. Further, the solvents used for bonding may attack the adhesive, which can lead to detachment of the tubing, channel clogging, and/or contamination of the sample and/or reagents delivered to the microfluidic device. Moreover, adhesive bonding, such as epoxy bonding, provides a permanent joint, thereby reducing the probability of having a reconfigurable device. For example, the permanent joint makes it difficult to change components, i.e., either the microfluidic device or the tubing, if necessary. Thus, assembly, repair and maintenance of such devices become labor and time intensive, a particularly undesirable feature when the microfluidic device is used for high throughput screening of samples such as, drug discovery, or in research environment, where reconfigurability of interfacing devices is useful.

To overcome problems associated with adhesive bonding, other techniques have been proposed in the past, e.g., press fitting the tubing into a port on the microfluidic device. However, such a connection typically is unsuitable for high-pressure applications such as high-pressure liquid chromatographs. Also, such connections have very low levels of tolerance. Particularly, the very low levels of tolerance pose a challenge in systems that employ multiple connectors for devices (i.e., scale up). Also, such connections require high sealing forces; these high sealing forces may sometimes cause the microfluidic chip to crack.

Other methods involve introducing liquids into an open port on the microfluidic device with the use of an external delivery system such as a pipette. In these methods, connection to the ports on the microfluidic device is typically by means of a micropipette end. However, this technique is also undesirable due to the possibility of leaks and spills that may lead to contamination. In addition, the fluid is delivered discretely rather than continuously. Moreover, the open pipetting techniques do not permit the use of elevated pressure for fluid delivery such as delivery by a pump, thereby further restricting the applicability of the microfluidic device.

Therefore, there exists a need for an improved fluid connector device for microfluidic devices, which is useful in different applications of the microfluidic devices and provides an effective, high pressure, low fluid dead volume seal.

BRIEF DESCRIPTION

In one embodiment, a fluid connector device is provided. The fluid connector device includes a coupling substrate having a conformal recess, and a reconnectable fitting disposed in the conformal recess to provide a passageway. Further, the fluid connector device includes a force applying element operatively coupled to the reconnectable fitting, or the coupling substrate, or both the reconnectable fitting and the coupling substrate to at least partially provide a sealing force between the reconnectable fitting and the coupling substrate, wherein at least one of the force applying element, the reconnectable fitting, and the coupling substrate comprises one or more degrees of freedom for self alignment of the reconnectable fitting and the conformal recess.

In another embodiment, a fluid connector assembly is provided. The assembly includes a coupling substrate having a first surface and a second surface. The coupling substrate has one or more conformal recesses on the first surface. Further, the assembly includes one or more reconnectable fittings that are at least partially disposed in the conformal recess to provide a passageway between the microfluidic device and the reconnectable fittings such that the reconnectable fittings are in fluidic communication with the microfluidic device. Furthermore, the assembly includes a force applying element that at least partially provides a sealing force between the reconnectable fitting or the coupling substrate, or both the reconnectable fitting and the coupling substrate, where at least one of the force applying element, the reconnectable fitting, and the coupling substrate has one or more degrees of freedom for self alignment of the reconnectable fitting and the conformal recess. The assembly also includes a support structure in operative association with the force applying element.

In yet another embodiment, an adapter kit for introducing and/or extracting fluids from a microfluidic device is provided. The adapter kit includes a coupling substrate having a first surface and a second surface. The first surface includes a conformal recess. The adapter kit further includes a reconnectable fitting disposed in the recess to provide a first passageway for one or more fluid conduits. The adapter kit also includes a force applying element that at least partially provides a sealing force between the reconnectable fitting or the coupling substrate, or both the reconnectable fitting and the coupling substrate, and where at least one of the force applying element, the reconnectable fitting, and the coupling substrate has one or more degrees of freedom for self alignment of the reconnectable fitting and the conformal recess.

DRAWINGS

These and other features, aspects, and advantages of the present invention will become better understood when the following detailed description is read with reference to the accompanying drawings in which like characters represent like parts throughout the drawings, wherein:

FIG. 3 is a perspective view of a portion of a reconnectable fitting, in accordance with embodiments of the present technique;

FIGS. 4-8 are examples of reconnectable fittings having difference shapes, in accordance with embodiments of the present technique;

FIGS. 9-12 are cross sectional views of fluid connector devices, in accordance with embodiments of the present technique;

DETAILED DESCRIPTION

Figure 1:
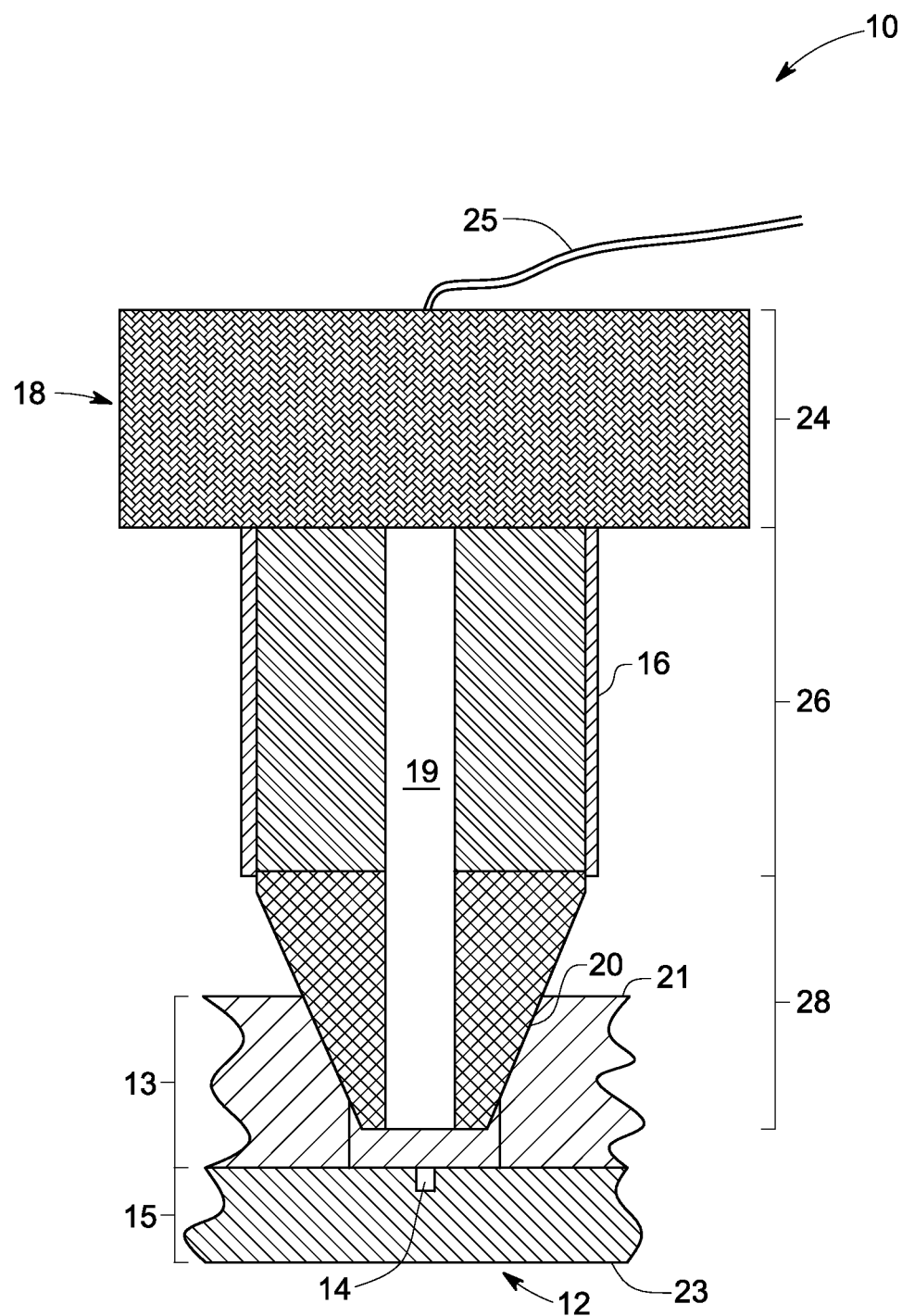
FIG. 1 is a cross sectional view of a fluid connector device, in accordance with embodiments of the present technique.

The present invention is directed to microfluidic interconnects for introducing or extracting fluids (liquids or gases) from micro-fabricated fluidic devices, such as microfluidic devices. In certain embodiments, the fluid connector devices function as microfluidic interconnects to introduce or extract fluids from the microfluidic devices. The fluid connector devices may be used for interfacing microfluidic devices with each other or with other fluidic components and systems, such as but not limited to, pumps, filters, syringes, aerosol collectors, flow cytometers, and chemical analyzers. In one embodiment, a fluid connector device may couple at least one fluid conduit to a corresponding port of a microfluidic device.

In certain embodiments, the fluid connector device may be used for synthesis or analysis operations. As described in detail below, the present technique provides several advantages, which are useful for conducting chemical analysis or synthesis using microfluidic devices. In one example, the analysis or synthesis operations may be carried out on micro scale devices and may require the application of high pressures.

Advantageously, the fluid connector device of the present invention is easy to assemble and disassemble, and provides flexibility for scale-ups. Also, the fluid connector device may be manufactured in rapid prototyping environment. In addition, the small size of the fluid connector device helps in interfacing the fluid connector device with the millimeter and sub-millimeter scale channels of microfluidic devices. Moreover, the fluid connector device includes a self-aligning connection, which is adaptable to individual microchip assemblies having a determined fitting density (or port density).

In one embodiment, the fluid connector device provides a fluid and gas tight seal, which substantially extends across a face of a fluid conduit, thereby minimizing fluid dead volume, i.e., the area that is void of fluid during flushing, between the end of the fluid conduit and the port of the microfluidic device. Thus, the microfluidic device employing the fluid connector device of the present technique may be used repeatedly for same or different reagents, while reducing or eliminating errors resulting from contamination. Additionally, since the fluid dead volume associated with the face seal is significantly less, the possibility of cross contamination among various samples during analysis is substantially reduced, or eliminated. Also, the growth of bacteria or other related contaminants is reduced by low dead volume.

The fluid connector device of the present technique utilizes no adhesives. Advantageously, not using an adhesive enables the fluid connector device to be removably attached to a microfluidic device assembly. In addition, the fluid connector device provides a low cost, high-pressure seal, which is easily removable and reusable. Moreover, the fluid connector device has a small footprint, allowing for multiple connections to be made in a very small area, thereby retaining the advantages of miniaturization.

In certain embodiments, the fluid connector device includes a coupling substrate having a first surface and a second surface, where the coupling substrate may have one or more conformal recesses. In one embodiment, the coupling substrate may be the device substrate. In other words, the coupling substrate may be the microfluidic device (e.g., a microfluidic chip), and the conformal recess may be formed in the microfluidic device.

The fluid connector device further includes a reconnectable fitting that fits in the conformal recess to provide a first passageway to a corresponding port of a device substrate. The reconnectable fitting is configured to be disposed back in the conformal recess after being at least partially moved away (dislocated) from a determined position in the conformal recess. For example, the reconnectable fitting may be disposed back in the determined position in the conformal recess after being at least partially ejected out of the conformal recess during operation of the device. In one embodiment, one or more fluid conduits may be disposed in the passageway for enabling transfer of fluids or gases between external devices and the microfluidic device. In another embodiment, the passageway itself may be used for transfer of fluids or gases between external devices and the microfluidic device. That is, in this embodiment, no additional fluid conduits may be required to enable transfer of fluids or gases between the external devices and the microfluidic device.

In one embodiment, the conformal recess may not be pre-formed in the coupling substrate prior to receiving the reconnectable fitting. In this embodiment, the material of the coupling substrate may be configured to undergo thermal or pressure induced material yielding while receiving the reconnectable fitting. That is, when the reconnectable fitting is pressed against the coupling substrate, the yielding of the coupling substrate in and around the area that receives the reconnectable fitting may form a conformal recess. The conformal recess so formed may have a fluid tight seal with the reconnectable fitting. In another embodiment, the material of the reconnectable fitting may be configured to undergo thermal or pressure induced material yielding while being disposed in a conformal recess.

Advantageously, the fluid connector device may be able to withstand high pressures, while maintaining low dead volume. In one example, the fluid tight seal provided by the fluid connector device may be configured to withstand pressures of over 1000 bars. During operation of the device, if the reconnectable fitting gets dislocated from the determined position, e.g., at least partially moved out of the conformal recess, it may result in leakage of fluid being injected or extracted from the microfluidic chip. In certain embodiments, the reconnectable fitting is configured to self-align itself into the conformal recess in the event it is moved away from the determined position, thereby preventing such leakages. The reconnectable fitting may snuggly fit in the conformal recess, such that a substantial portion of the outer wall of the portion of the reconnectable fitting disposed in the conformal recess is in contact with an inner wall of the recess.

The conformal recess or the reconnectable fitting, or both the conformal recess and the reconnectable fitting may undergo either elastic or plastic deformation to provide a seal between the reconnectable fitting and the coupling substrate. In one example, only the conformal recess may undergo deformation, for example, an elastic deformation. In another example, both the conformal recess and the reconnectable fitting may undergo deformation. In this example, the conformal recess may undergo elastic deformation, and the reconnectable fitting may undergo plastic deformation.

The material of the reconnectable fitting and the coupling substrate may be chosen based on the deformation properties (elastic or plastic deformation) of the material, or values of the temperature and pressure, and type of fluids that the fluid connector device may be exposed to. The materials of the coupling substrate and/or the reconnectable fitting are configured to undergo at least partial deformation. In certain embodiments, the materials of the coupling substrate and/or the reconnectable fitting may include glass, metals, semiconductors, ceramics, polymers, or combinations thereof. The material for the coupling substrate may be such that one or more conformal recesses can be formed in the coupling substrate. The material of the coupling substrate may be chosen based on the ease of formation of the desired recess shape in the substrate material. For example, it may be easier to form a conical or a tapered recess in a polymer substrate in comparison to a metal substrate, or a semiconductor substrate, or a ceramic substrate, such as a glass substrate. The polymers for the coupling substrate and/or the reconnectable fitting may be either soft polymers or hard polymers. Soft polymers refer to elastomer type materials such as, but not limited to, polydimethylsiloxane, a copolymer of hexafluoropropylene (HFP) and vinylidene fluoride (VDF or $VF_2$), a terpolymer of tetrafluoroethylene (TFE), vinylidene fluoride (VDF), and hexafluoropropylene (HFP), perfluoromethylvinylether (PMVE), nitrile rubber, and thermoplastic elastomers such as ELASTRON® and THERMOLAST®. Hard polymers refer to materials such as polyether ether ketone (PEEK), polypropylene, poly(methyl methacrylate) (PMMA), polyethelene, olefin copolymers (e.g., TOPAS®), modified ethylene-tetrafluoroethylene) fluoropolymer (ETFE) (e.g., TEFZEL®), Polyetherimide (e.g., ULTEM®), cyclic olefin copolymer (COC), and the like.

In certain embodiments, the shape of the conformable recess may include a tapered geometry. The shape of the recess may include any tapered geometries that can receive the reconnectable fitting and form a leak proof seal with the reconnectable fitting. Non-limiting examples of tapered geometries for the conformal recess may include a conical shape, a parabolic shape, a trapezoidal shape, a pyramidal shape, a hemispherical shape, a barrel shape, or combinations thereof. The conformal recess may be formed by any conventional techniques depending on the material of the coupling substrate. In one example, where the material of the coupling substrate is a polymer, the conformal recess may be formed by drilling, milling, embossing, molding, or turning.

As with the conformal recess, the reconnectable fittings may include tapered geometries such as but not limited to, a conical shape, a parabolic shape, a trapezoidal shape, a pyramidal shape, a hemispherical shape, a barrel shape, or combinations thereof, or any other geometries that forms a leak proof seal with the tapered geometry of the conformal recess. In the case of the fittings having conical shape, the fittings may be standard conical fittings. The fittings may be commercially available or custom made. In one embodiment, the fittings may be replaced by tubing (e.g., capillary tubes) having a tapered end, or external fluid vessels (e.g., reagent storage vessels, reactor vessels, fluid transfer vessels) having a tapered end. In one example, the standard conical fittings may be commercially available PEEK 10-32 fittings. In another embodiment, the reconnectable fitting may be fabricated by machining. Machining allows a wide range of materials, including plastics, ceramics, and metals, to be used depending on the expected operating conditions. In one example, the geometries of the reconnectable fitting and the conformal recess may form a self-locking mechanism.

In one embodiment, the size of the tapered end of the conformal recess may be smaller than the size of the reconnectable fitting. In this embodiment, a wall of the conformal recess at the tapered end may collapse directly against the reconnectable fitting due to compressive forces that are created as the reconnectable fitting is pushed into the conformal recess. In one embodiment, collapse or deformation of the conformal recess may prevent the fluid conduit from extruding out of the reconnectable fitting during high-pressure operations. Also, the deformation of the conformal recess may provide a fluid tight seal. In another embodiment, the reconnectable fitting may be removably coupled to the conformal recess. In this embodiment, a portion of the conformal recess surrounding the tapered end of the reconnectable fitting may undergo elastic deformation. In one embodiment, the reconnectable fitting may be finger-tightened in the conformal recess to provide a seal. In another embodiment, a linear actuator may be utilized to press the reconnectable fitting into the conformal recess. In one embodiment, a force of about 50N may be required to provide the seal that can withstand a minimum pressure of at least about 1000 bars.

Optionally, the conformal recess, and/or the tapered geometry of the reconnectable fitting that is configured to be disposed in the conformal recess may include a surface modification. The surface modification may be present either in a portion, or the entire surface of the conformal recess and/or the tapered geometry of the reconnectable fitting. In embodiments where the conformal recess is not pre-formed in the coupling substrate, the portion of the coupling substrate that is supposed to undergo deformation upon receiving the reconnectable fitting to form the conformal recess may include surface modification. In one example, the surface modifications may be provided to improve the coupling between the reconnectable fitting and the coupling substrate to reduce or eliminate any leaks. Non-limiting examples of types of surface modifications may include a soft coating, a hard coating, a hydrophobic material, an adhesive, a high roughness surface (such as a plasma etched, or a reactive ion etched surface), a low roughness surface (such as a coated area, a polished area), physical features, such as threads. The type of surface modifications may depend on the type of material being employed for the reconnectable fitting and the coupling substrate.

In certain embodiments, the fluid connector device includes a force applying element. The force applying element provides a sealing force between the reconnectable fitting and the coupling substrate. In addition, at least one of the force applying element, the reconnectable fitting, and the coupling substrate provides one or more degrees of freedom for the movement of the reconnectable fitting. The force applying element provides degrees of freedom to the reconnectable fitting along one or more of x, y or z-directions. The force applying element may also provide rotational movement to the reconnectable fitting about one or more of x, y or z-axis. For example, the force applying element enables translational and/or rotational movements of the reconnectable fitting to enable self-alignment of the geometries of the reconnectable fitting and the conformal recess. This way, in case of dislocation of the reconnectable fitting from the determined position, the force applying element may facilitate re-disposing the reconnectable fitting in a determined position in the conformal recess by applying a counter force to maintain the sealing between the coupling substrate and the reconnectable fitting. Also, the degrees of freedom for the movement of the reconnectable fitting facilitate release of stress within the system, thereby improving the sealing behavior.

In one embodiment, the sealing force provided by the force applying element may deform either the reconnectable fitting, or the coupling substrate, or both. The sealing force enables the formation of a fluid and gas tight seal. In one embodiment, at least a portion of the conformal recess, or the reconnectable fitting, or both the conformal recess and the reconnectable fitting may undergo at least partial deformation to provide a leak proof seal. In one example, the conformal recess may undergo deformation to acquire the shape of a portion of the fitting being disposed in the recess and to provide a leak proof seal. The conformal recess may deform around a tapered end of the reconnectable fitting to provide a leak-proof seal around the tapered portion of the reconnectable fitting. In one example, the reconnectable fitting and the coupling substrate may be made of PEEK, in this example, the reconnectable fitting and the coupling substrate may be sealed by thermal treatment.

The force applying element may be made of a material that may apply a force that does not change substantially when the material is compressed by a few microns. In other words, the force applying element may be made of a material that is able to proportionally translate a determined deformation of the material of the force applying element into a determined force. Non-limiting examples of a force applying element may include a spring, a lever-like structure, a flexure, a gas based structure (e.g., a flexible gas channel), a vacuum based structure, a fluid based structure (e.g., a flexible fluid channel), a compressive structure, a hydraulic transducer, a pneumatic transducer, a magnetic transducer, an electromagnetic transducer, a thermal transducer, an electromechanic transducer, an electrostatic transducer, a mechanic transducer, or combinations thereof. Non-limiting examples of flexure may include a lever-like structure (e.g., cantilever), a U-shaped structure, a V-shaped structure. The force applying element may be coupled to the reconnectable fitting by using snap-in mechanism.

In one embodiment, during operation of the fluid connector device, the force applying element may apply a continuous force to the reconnectable fitting, or the coupling substrate, or both, to maintain the leak proof seal between the reconnectable fitting and the conformal recess. In another embodiment, the force applying element may provide a discontinuous force. In this embodiment, the force applying element may provide force in one or more steps. For example, in one step, the force applying element may provide a sealing force between the reconnectable fitting or and the coupling substrate, and in the second and last step (post operation of the fluid connector device), the force applying element may provide a force to de-couple the reconnectable fitting and the coupling substrate. In this way, the force applying may enable both coupling and de-coupling of the component reconnectable fitting and the coupling substrate. Once decoupled, the fluid connector device may be used with other devices, such as other microfluidic chips.

In case of the microfluidic assembly employing two or more fluid connector devices, each of the reconnectable fittings may be in operative association with a corresponding force applying element. In embodiments where the force applying element is a spring, each reconnectable fitting is coupled to a corresponding spring, and all the springs are independent from each other. In one embodiment, each of the reconnectable fittings is mechanically decoupled from the others to allow independent self-alignment and application of constant force.

In addition to the force applying element, the reconnectable fitting may be optionally coupled to a bushing to allow small movements, such as movement in x-y plane, of the reconnectable fittings to facilitate self-alignment of the reconnectable fittings and the conformal recess.

In certain embodiments, the fluid connector device may be coupled (such as clamped) to a support structure, such as a planar support plate, a L-shaped structure, a U-shaped structure, or a clamp stand, to hold the fluid connector device in place. In one embodiment, the support structure may undergo deformation. For example, in case of the support structure being in the shape of the flexure, the support structure may open up under deformation. In case of a microfluidic assembly employing two or more fluid connector devices, the fluid connector devices may have either common or individual support structures. In one example, the two or more fluid connector devices may be coupled to a common support plate. In another example, each of the two or more fluid connector devices may be clamped to corresponding individual clamp stands. In one embodiment, the support structure may be made of a metal, a ceramic, a polymer, or combinations thereof.

In certain embodiments, the fluid connector device may be disconnected from the microfluidic assembly. In these embodiments, the reconnectable fitting is configured to decouple from the microfluidic device, for example, by moving out of the conformal recess. Subsequently, if required, the fluid connector device may be re-coupled with the microfluidic assembly.

In certain embodiments, the micro-fabricated fluidic device or microfluidic device may have one or more ports for introducing or withdrawing fluids from the microfluidic devices. In addition, the microfluidic device may include one or more channels for conducting chemical analyses, chemical synthesis, mixing fluids, or separating components from a mixture that are in fluid communication with the ports. In certain embodiments, the microfluidic device may have dimensions ranging from picolitres to milliliters. The fluid connector device enables introducing microliter and sub-microliter quantities of solutions into the microfluidic device without leak. In one embodiment, the microfluidic device may be in operative association with external components such as channels, pumps, valves, sensors, reaction chambers, particle separators, and electronics. The fluid connector device enables interfacing between microfluidic devices and the components.

The microfluidic device may be made of any suitable material, such as but not limited to, silicon, glass, or plastic. The microfluidic device may be fabricated using fabrication techniques, such as but not limited to, photolithography, etching, electroplating, thin film deposition, conventional machining, embossing, and bonding. The microchannels in the microfluidic device may be etched, milled, embossed, or molded into the surface of a suitable substrate and may be enclosed by bonding another substrate over the etched or impressed side of the first substrate to produce a microfluidic device.

As used herein, "microfluidic" channel, or "microchannel" is a channel, (e.g., sealed enclosed groove, depression, tube, or capillary) which is adapted to handle small volumes of fluid. In one embodiment, a microchannel or a subsection of the microchannel may have a cross-sectional dimension of between about 0.1 microns and 1000 microns. The width and depth of the microfluidic channel may be adjusted to facilitate certain applications, e.g., to carry out solution mixing, thermal isolation, and the like.

In certain embodiments, the microfluidic device is part of a lab on a chip and employs one or more microfluidic channels. In one example, the lab on a chip may include a disk or block (a "chip") made of a material, e.g. a plastic, in which microchannels are formed. The microchannels open into chambers where the samples flowing through the microchannels may be reacted with reagents. The results of the reactions may be observed through the transparent disc or block walls and/or the products of the reactions may be output from the chip for further processing or analysis.

FIG. 1 illustrates a fluid connector device 10 having a microfluidic device 12 as a coupling substrate, a reconnectable fitting 18, and a force applying element 16. The fluid connector device 10 may be used for connecting external liquid flow streams to the microfluidic device 12. In the illustrated embodiment, the microfluidic device 12 is formed of device substrates 13 and 15, which are coupled together. Although not illustrated, in some embodiments, the microfluidic device 12 may be formed of a single substrate. The microfluidic device 12 further includes a microfluidic channel 14 disposed between the device substrates 13 and 15. The microfluidic channel 14 may be a part of the network (not shown) of microfluidic channels of the microfluidic device 12. Non-limiting examples of the microfluidic channel 14 may be a reactor, an electrophoretic separation channel, or a liquid chromatography column. In addition, other appropriate hardware may be present, e.g., electrodes, pumps and the like, to practice the intended application, e.g., electrophoretic migration and/or separation, or chromatographic separation. Although not illustrated, in some embodiments, the fluid connector device 10 may be used to connect two independent (not interconnected) channels of the same microfluidic device 12 to each other to allow fluid communication between the two independent channels.

The microfluidic device 12 includes a first surface 21 and a second surface 23. The first surface 21 of the microfluidic device 12 may include one or more conformal recesses, such as a recess 20. Although not illustrated, alternatively, the conformal recess may be present on the second surface 23, or along the thickness of the microfluidic device 12. In one embodiment, the material of the microfluidic device 12 may include a material that may undergo elastic or plastic deformation to provide a leak proof fluid path from the reconnectable fitting 18 to the microfluidic device 12. In one example, the material of the device substrate 13 may be configured to undergo elastic or plastic deformation, whereas, the device substrate 15 may or may not be configured to undergo elastic or plastic deformation.

When disposed in the recess 20, the reconnectable fitting 18 provides a first passageway 19 for one or more fluid conduits 25 to a corresponding port (not shown) of the microfluidic channel 14. In one embodiment, the fluid conduits 25 extend through the passageway 19 to enter the corresponding port of the microfluidic channel 14. The reconnectable fitting 18 includes an upper portion 24, a middle portion 26, and a lower tapered end 28. The lower tapered end 28 is dimensioned to fit within the recess 20. In one embodiment, the middle portion 26 may be an externally threaded portion. The passageway 19 runs the length of the reconnectable fitting 18. In one embodiment, the passageway 19 is preferably narrower at the tapered end (as compared to the upper portion 24) of the fitting 18. Although in the illustrated embodiment, the reconnectable fitting 18 has a single central passageway 19, it should be noted that the reconnectable fitting 18 may have two or more passageways. In the illustrated embodiment, the passageway 19 is a cylindrical cavity that is substantially concentric with the central axis of the reconnectable fitting 18. Although not illustrated, in embodiments where a plurality of passageways are employed, the passageways may be equidistantly spaced apart. For example, the plurality of passageways may be arranged in a circle centered on the central axis of the reconnectable fitting 18, or arranged in another regular pattern.

The conformal recess 20 may be made in different shapes depending on the shape of the reconnectable fitting 18. Although the recess 20 and the reconnectable fitting 18 are shown to have conical shapes, it should be noted that these two components may have any other suitable geometrical shapes. Also, the shape of the recess 20 and the reconnectable fitting 18 may be the same or different. In case of the microfluidic device 12 employing a plurality of recesses, the recesses may have either the same or different shapes.

The force applying element 16 at least partially provides sealing force between the reconnectable fitting 18 and the coupling substrate 12. In operation, the force applying element 16 may be configured to relieve stress at the interface between the microfluidic device 12 and the reconnectable fitting 18. The force applying element 16 allows the force exerted by the flowing fluid to be compensated. The mechanical design of the force applying element 16 may be configured to apply force on a portion of the fitting 18 that is sufficient to create a face seal, as described in detail above, which is capable of withstanding high-pressure. In one example, the fluid connector device 10 may be successfully operated at pressures ranging from about 0 bars to about 500 bars. In the illustrated embodiment, the force applying element 16 is a spring that is disposed on the externally threaded middle portion 26 of the reconnectable fitting 18.

The force applying element 16 enables the fluid connector device 10 to endure high pressure regimes while causing minimal or no physical damage to the fluid connector device 10 or the microfluidic device 12. For example, the force applying element 16 may prevent undesired deformation, or movement of the device substrates 13 and 15 of the microfluidic device 12 in presence of high pressures, such as the high force of the fluid entering or exiting the fluid conduits. In one example, the force applying element 16 may at least partially deform in the presence of high pressure, thereby preventing any damages to the devices 10 and 12.

Figure 2:
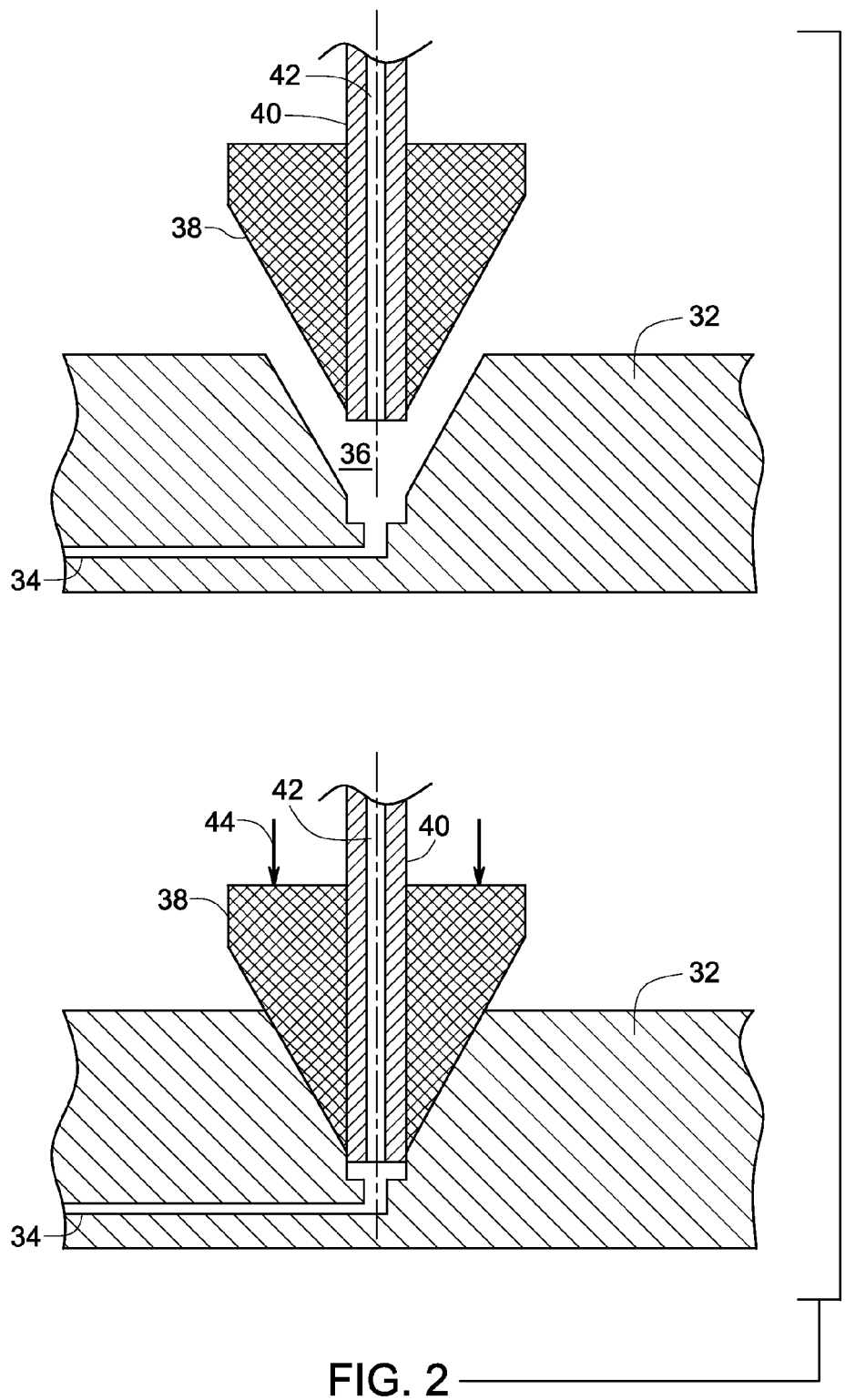
FIG. 2 is a cross sectional view of a method for assembling a fluid connector device, in accordance with embodiments of the present technique.

FIG. 2 illustrates a method for assembling the fluid connector device. In the illustrated embodiment, the coupling substrate is a microfluidic device 32. The microfluidic device 32 includes a microfluidic channel 34. A conformal recess 36 is formed in the microfluidic device 32. A reconnectable fitting 38 having a passageway 40 and a fluid conduit 42 (such as a capillary) is provided. As represented by arrows 44, a force is applied to provide a fluid tight seal between the reconnectable fitting 38 and the microfluidic device 32. In the illustrated embodiment, the force 44 is an axial force that is applied to the reconnectable fitting 38 to provide a leak proof seal between the reconnectable fitting 38 and the recess 36. Upon application of the axial force 44, a portion of the microfluidic device 32 surrounding the conform recess 36 may undergo an elastic or plastic deformation. Alternatively, a portion of the reconnectable fitting 38, which is disposed in the recess 36 may undergo elastic or plastic deformation. In one example, collapsing of the wall of the conformal recess 36 forms a leak proof seal.

FIG. 3 illustrates an example of a reconnectable fitting 45. As illustrated by the straight arrows 41, 43 and 46, the reconnectable fitting 45 is adapted to undergo small displacements in one or more of x, y, or z directions while being disposed in a conformal recess. In addition to lateral displacements, the reconnectable fitting 45 is also configured to undergo small rotational movements along one or more of the x, y, or z-axis, as represented by the curved arrows 47, 49 and 50. In certain embodiments, it may be desirable to have sufficient degrees of freedom for the movement of the fluid connector device. For example, translational and rotational movements of the reconnectable fitting may enable self-alignment of the geometries of the reconnectable fitting and the conformal recess. Also, the degrees of freedom for the movement of the reconnectable fitting 45 facilitate release of stress within the system, thereby improving the sealing behavior, and avoiding interaction between fluid connector devices. In addition, the translational and rotational movements of the reconnectable fitting also provide sealing between the reconnectable fitting and the microfluidic chip.

FIGS. 4-8 illustrate examples of embodiments of reconnectable fittings with different shapes. FIGS. 4-8 illustrate conical shaped reconnectable fitting 52. The conical fitting 52 includes a passageway 54 for providing a fluid path between the external devices and the microfluidic device. In the illustrated embodiment of FIGS. 4 and 5, the passageway 54 is used as a fluid path between external devices and a microfluidic device and the reconnectable fitting 52. However, in the embodiment illustrated in FIG. 6, the passageway 56 employs a capillary 58 to provide a fluid path between the microfluidic device and the reconnectable fitting 52. Typically, the passageway that is used as a fluid path (such as the passageway 54) may be narrower than the passageway that employs fluid conduits, such as the passageway 56. FIG. 7 illustrates a pyramidal shaped reconnectable fitting 60 having a passageway 62. Similarly, FIG. 8 illustrates a barrel shaped reconnectable fitting 64 having a passageway 66. Although not illustrated, the fittings 64 and 66 of FIGS. 7 and 8, respectively, may employ fluid conduits.

FIG. 9 illustrates a simplified arrangement for a fluid connector device of the present technique. In the illustrated embodiment, the fluid connector device 72 employs a microfluidic device 74 that functions as a coupling substrate to provide a conformal recess 76. A reconnectable fitting 78 is disposed in the conformal recess 76. The reconnectable fitting 78 is coupled to a force applying element, such as a spring 80. In case of any movement of the reconnectable fitting 78 from its position, the spring 80 facilitates retaining the reconnectable fitting 78 in the conformal recess 76. The spring 80 is also coupled to a support plate 82. For a small displacement ($\delta$) 86 of the support plate 82, there is a corresponding deformation or displacement ($\alpha$) of either the reconnectable fitting 78 or the substrate of the microfluidic device 74, generally represented by reference numeral 84. Typically, $\alpha$ 84 is much smaller than $\delta$ 86. That is, a small displacement of the reconnectable fitting 78 in the recess 76 causes a much larger displacement in the support plate 82. The displacement ($\delta$) 86 of the support plate 82 is translated into a spring force. The spring force serves to maintain the sealing between the reconnectable fitting 78 and the microfluidic device 74. The force exerted by the force applying element, spring 80, is proportional to the amount of deformation or displacement ($\alpha$) 86 experienced by the reconnectable fitting 78. The deformation or displacement ($\alpha$) 86 of the reconnectable fitting 78 may be in the form of a translational movement in one or more of x, y and z-directions, or a rotational movement about one or more of x, y and z-directions, or both. In one embodiment, the spring 80 may exert continuous pressure on the reconnectable fitting 78 to retain the reconnectable fitting 78 in the desired position in the conformal recess 76.

In an alternate arrangement, FIG. 10 illustrates a fluid connector device 90. In the illustrated embodiment, the device 90 includes a microfluidic device 92 having a microfluidic channel 94 and a conformal recess 96. One end of a force applying element, such as a spring 98 is coupled to the microfluidic device 92. The other end of the spring 98 is fixed to a non-movable fixture. However, although not illustrated, instead of being attached to a non-movable fixture, the other end of the spring 98 may be coupled to a movable support structure, which may be movable along y-axis. In the illustrated embodiment, the microfluidic device 92 is movable along y-direction as illustrated by arrow 100. In the illustrated embodiment, the reconnectable fitting 102 is integrated with a support structure 104. The reconnectable fitting 102 is disposed in the conformal recess 96. In operation, the reconnectable fitting 102 is maintained in the conformal recess 96 due to the force exerted by the spring 98.

Figure 11:
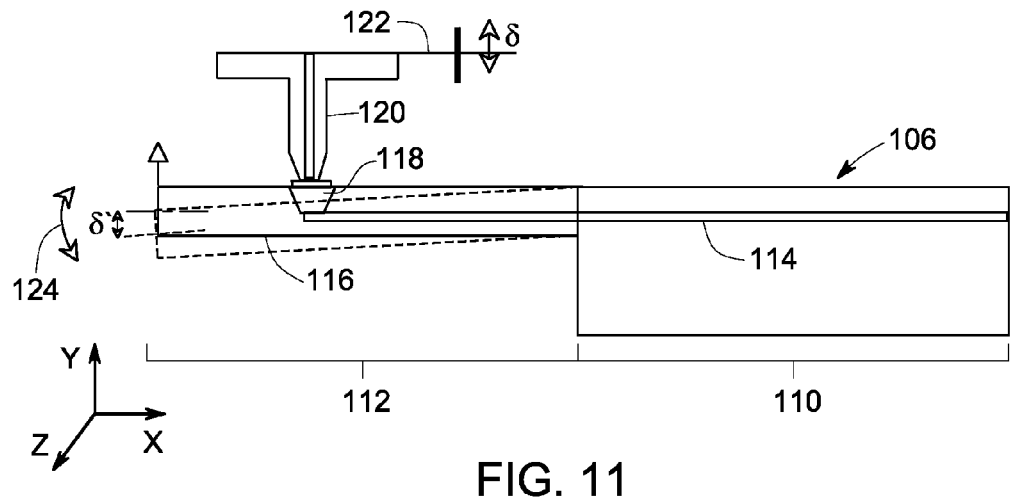

FIG. 11 illustrates an example where the force applying element is integrated into the microfluidic device 106. A portion 110 of the microfluidic device 106 includes a microfluidic channel 114, and the portion 112 of the microfluidic device 106 includes a lever-like structure that serves as a force applying element. In the illustrated embodiment, the lever-like structure is a cantilever 116. Although not illustrated, a flexure may be used in place of the cantilever 116. The portion 112 of the microfluidic device 106 having the cantilever 116 may be narrower than the portion 110 of the microfluidic device 116. The microfluidic device 106 includes a conformal recess 118. A reconnectable fitting 120 may be disposed in the conformal recess 118. The reconnectable fitting 120 is coupled to a support plate 122. The support plate 122 along with the reconnectable fitting 120 is configured to move in y-direction. A displacement ($\delta$) of the reconnectable fitting 120 and the microfluidic device 112 results in bending 124 or displacement ($\delta'$) of the cantilever 116, and the spring force (F) results from material properties of microfluidic device 116. The spring force thus generated facilitates retaining the reconnectable fitting 120 in the conformal recess 118, and may also create a deformation ($\alpha$) of the microfluidic device 116 and/or the reconnectable fitting 120.

Figure 12:
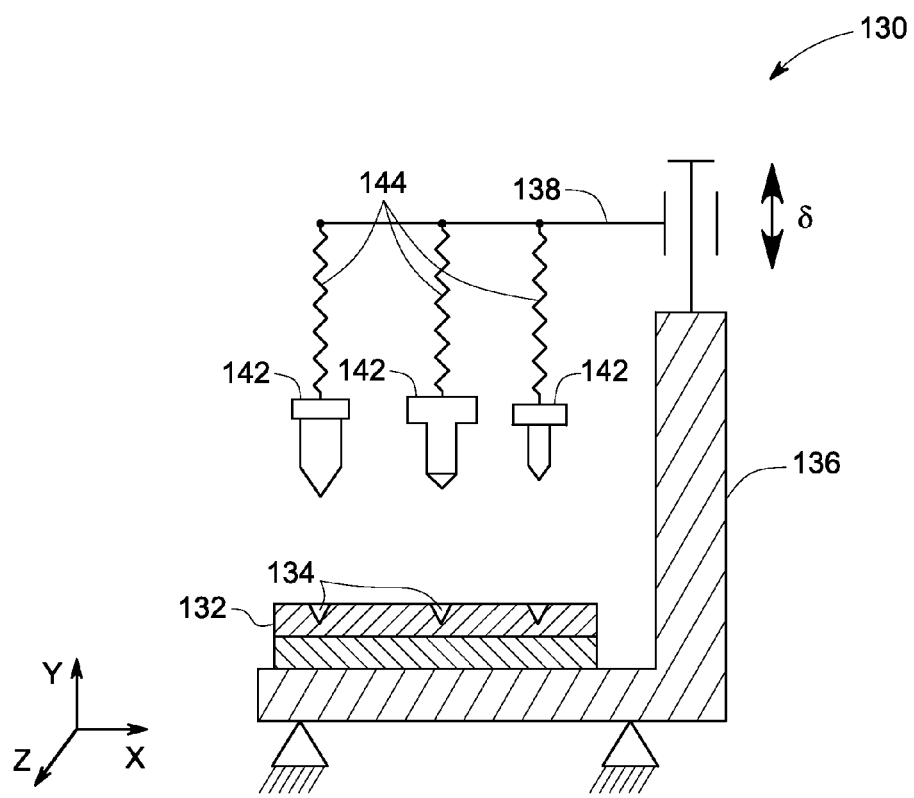

FIG. 12 illustrates a fluid connector device 130 that includes a microfluidic device 132 having a plurality of conformal recesses 134. The microfluidic device 132 is coupled to one arm of a L-shaped holder 136. A support plate 138 is coupled to other arm of the L-shaped holder 136. As illustrated by the arrow 140, the support plate 138 is configured to move along y-direction on the L-shaped holder 136. The fluid connector device 130 also includes reconnectable fittings 142 coupled to corresponding force applying elements 144. The reconnectable fittings 142 have degrees of freedom (translational and rotational) in the x-, y- and z-directions. The support plate 138 may be glided down the L-shaped holder 136 to dispose the reconnectable fittings 142 in the conformal recesses 134. The sealing force may be provided by pressing the support plate 138. In operation, movement of the support plate 138, or compression or expansion of the force applying elements 144 may accommodate for the undesirable forces generated in the assembly.

Figure 13:
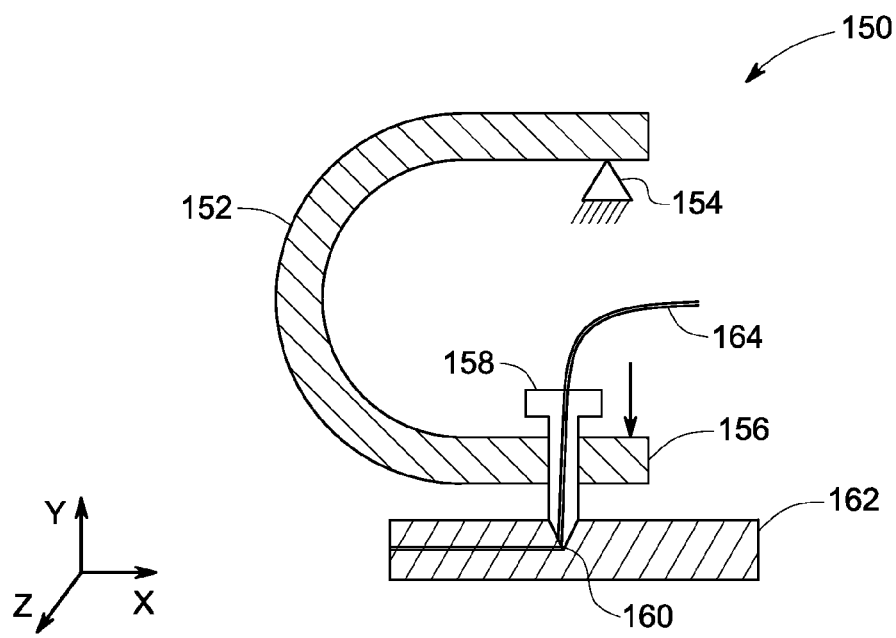
FIG. 13 is a cross sectional view of an example of a fluid connector device employing a U-shaped flexure as a force applying element, in accordance with embodiments of the present technique.

FIG. 13 illustrates an embodiment of the fluid connector device 150 that includes a flexure 152 as a force transducing device. In the illustrated embodiment, the flexure 152 is a U-shaped flexure, however, other shapes, such as but not limited to, L-shaped, V-shaped, are also envisioned within the scope of the invention. The flexure 152 is fixed at one end 154, while the other end 156 is free. The flexure 152 has a reconnectable fitting 158 coupled closer to the free end 156. The reconnectable fitting 158 may be built into the flexure 152. For example, the reconnectable fitting 158 may be disposed in a cavity (not shown) formed in the flexure 152. Alternatively, the reconnectable fitting 158 may be separate from the flexure 152, which may be physically coupled to the flexure 152 to form the fluid connector device 150. For example, the reconnectable fitting 158 may be coupled, such as screwed or bonded, on a portion of the flexure 152. A force F may be applied to the reconnectable fitting 158 disposed in the conformal recess 160 in the microfluidic device 162. The reconnectable fitting 158 may provide a passageway for the fluid conduit 164. The positioning of the reconnectable fitting 158 closer to the free end 156 of the flexure 152 may provide degrees of freedom in x-, y- and z-direction along with rotational motion along the three directions.

Figure 14:
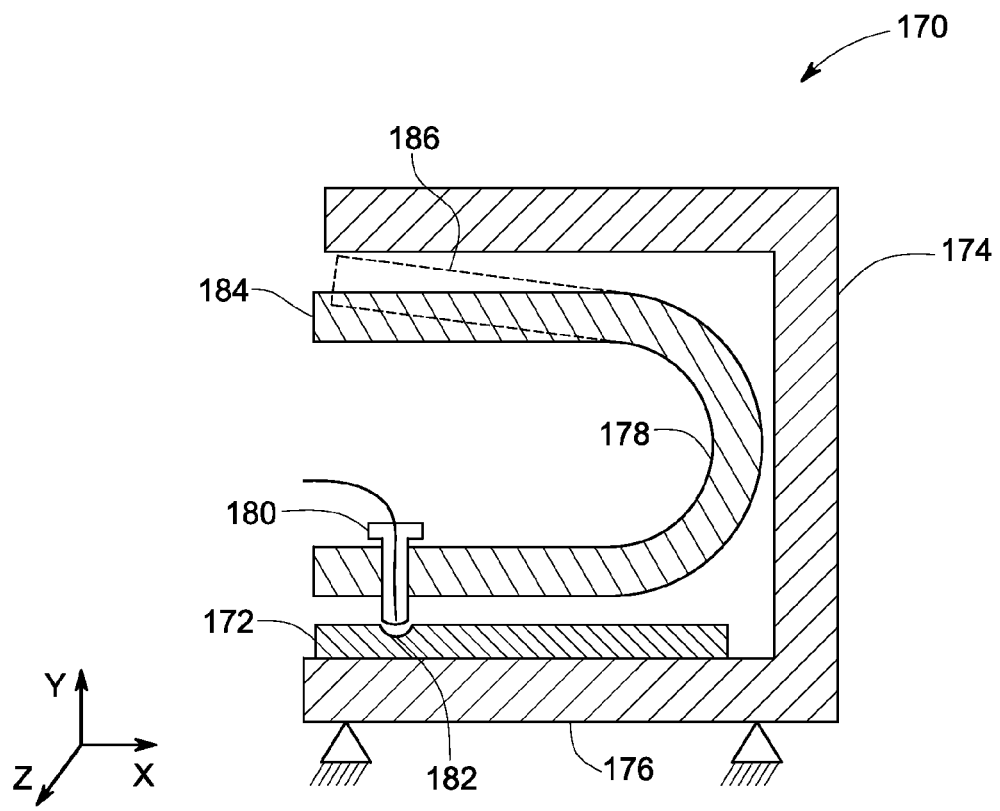
FIG. 14 is a cross sectional view of a fluid connector device employing a U-shaped flexure as a force applying element, and a square shaped support structure, in accordance with embodiments of the present technique.

Referring now to FIG. 14, a fluid connector device 170 includes a microfluidic device 172 disposed on one arm 176 of a bracket 174. In the illustrated embodiment, the bracket 174 is a square shaped bracket, however, other shapes of the bracket are also envisioned within the scope of the invention. The square shaped bracket 174 also serves as a support plate. A flexure, such as a U-shaped flexure 178, may be coupled to the microfluidic device 172 via a reconnectable fitting 180 that is disposed in a conformal recess 182 of the microfluidic device 172. The free end 184 of the U-shaped flexure 178 may be used to apply sealing force for sealing the reconnectable fitting 180 and the microfluidic device 172. The square shaped bracket 174 retains the U-shaped flexure 178 in its position by providing resistance to any movement of the flexure beyond a point, as represented by dashed lines 186. Although not illustrated, it should be understood that other shapes of the flexure 178 are envisioned within the scope of the invention.

Figure 15:
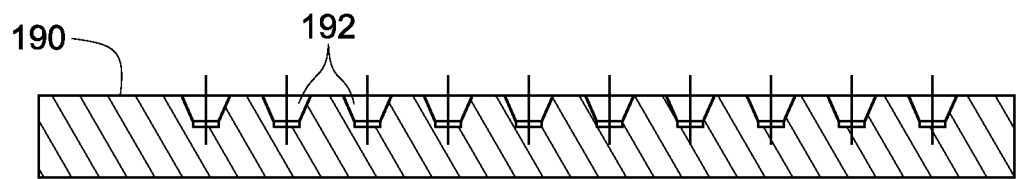
FIG. 15 is a cross sectional view of a portion of a fluid connector device having a coupling substrate with a plurality of conformal recesses for receiving reconnectable fittings.
Figure 16:
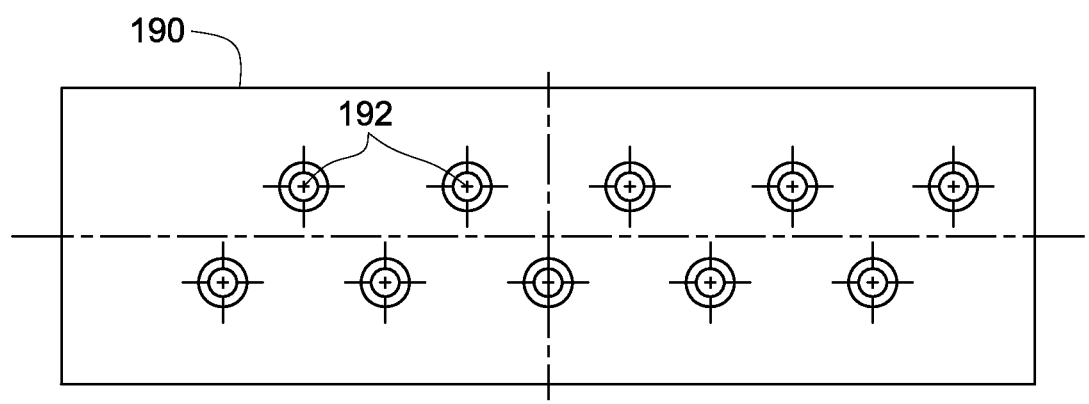
FIG. 16 is a top view of the portion of the fluid connector device of FIG. 15.

Referring now to FIGS. 15 and 16, a coupling substrate 190 includes an array of conformal recesses 192. Although in the illustrated embodiment, the conformal recesses 192 are all shown to have same shape and size, it should be noted that the conformal recesses 192 may have different shapes and/or size depending on the requirement of the underlying microfluidic device (not shown). In the illustrated embodiment, the recesses 192 are all conical shaped. Although the recesses 192 are shown to have conical shapes, it should be noted that the recesses 192 can have any other geometrical shapes that provide an interference fit with the reconnectable fittings. In one embodiment, the angle of the cone may be in a range from about 0 degrees to about 90 degrees. The different recesses may have the same or different cone angles depending on the angle of the tapered portion of the reconnectable fitting that the recess is designed to receive. The coupling substrate 190 may be a planar substrate. The shape and size of the planar substrate may vary depending on the shape of the microfluidic device underneath. Depending on the port density of the microfluidic device, the reconnectable fittings (not shown) may be disposed in some or all of the recesses 192.

Figure 17:
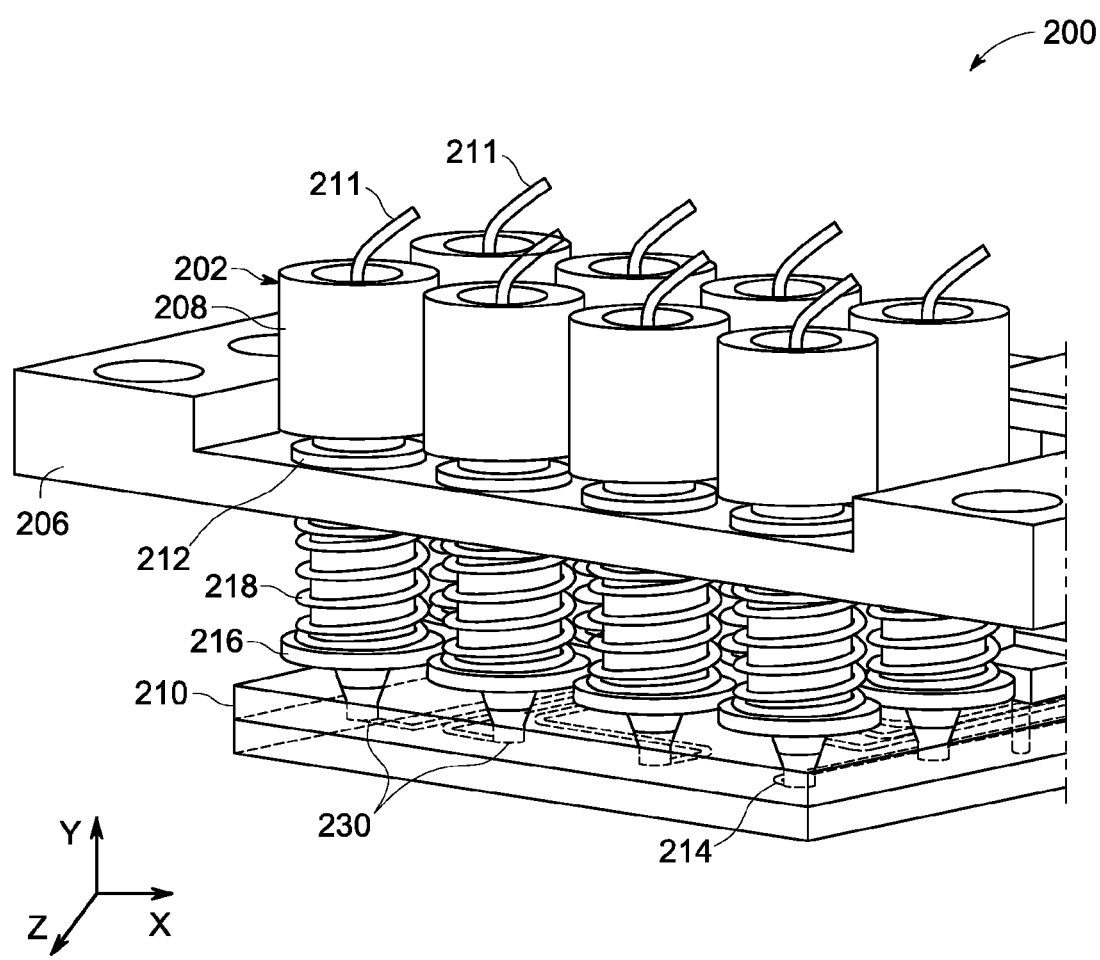
FIG. 17 is a perspective view of an example of a fluid connector assembly employing a coupling substrate, reconnectable fittings, and biasing components, in accordance with embodiments of the present technique.

FIG. 17 illustrates a fluid connector assembly 200 having fluid connector devices 202. The fluid connector devices 202 include reconnectable fittings 208, and a coupling substrate, such as the microfluidic chip 210, having recesses 214. The fluid connector devices 202 are operatively coupled to force applying elements 218 via the reconnectable fittings 208. Fluid conduits 211 extend through passageways in the reconnectable fittings 208 to connect to ports on the microfluidic chip 210. The fluid conduits 211 may be used for fluid inlet and fluid outlet for the microfluidic chip 210. In the illustrated embodiment, reconnectable fittings 208 are supported by a support plate 206.

In one embodiment, the support plate 206 may be movable. In this embodiment, the support plate 206 may be configured to move in z-direction. The support plate 206 is also used to provide a sealing force between the reconnectable fittings 208 and the microfluidic chip 210 by providing a downward force towards the microfluidic chip 210 in the z-direction. The reconnectable fittings 208 pass through holes (not shown) in the support plate 206. Optionally, the reconnectable fittings 208 may be held in place using fasteners, such as fasteners 212. In one example, the fasteners 212 may include a circlip, which is a fastener comprising a semi-flexible metal ring with open ends. At least the portion of the support plate 206 may be positioned directly above the microfluidic chip 210 such that no damaging stress concentrations are formed in the components of the assembly, such as the microfluidic chip 210, reconnectable fittings 208, etc.

In the illustrated embodiment, the force applying elements 218 may be disposed between the microfluidic chip 210 and the support plate 206. Advantageously, the different forces associated with the different force applying elements 218, are decoupled from each other due to the use of individual and mutually separate force applying elements 218 for each of the reconnectable fittings 208. Decoupling of the different forces associated with the different force applying elements 218 makes the forces more precise, and avoids interaction between fittings 208 that may otherwise result in leakage of fluid. In addition, since the reconnectable fittings 208 are independent of each other, one or more of the reconnectable fittings 208 may undergo translational or rotational movements to maintain the fluid tight seal. Further, decoupling of the reconnectable fittings 208 prevents interference in the movement of a reconnectable fitting caused due to other reconnectable fittings 208. That is, movements of reconnectable fittings 208 are independent of each other. Also, undesirable counter forces otherwise experienced by the reconnectable fittings 208, or any other extra forces in the assembly are reduced or eliminated as each of the reconnectable fittings 208 are independent from others.

Further, a bushing 216 may be disposed between the force applying elements 218 and the microfluidic chip 210, and may help in holding the force applying elements 218 in place. In its simplest form, the bushing 216 may be a hollow cylinder. The bushing 216 guides the reconnectable fitting 208 and provides one or more degrees of freedom for the reconnectable fitting 208. For example, the bushing 216 may enable the reconnectable fitting 208 to have one or more of a linear movement along z-axis, a rotational movement around the z-axis, or a tilting movement about the x- or y-axis. The bushing 216 may be configured to transfer the sealing force from force applying elements 218 to the reconnectable fitting 208.

In the event of one or more of the reconnectable fittings 208 being moved away from the determined position, the reconnectable fittings 208 are configured to self-align themselves into the corresponding conformal recesses 214. In certain embodiments, the force applying elements 218 allow free movement of the reconnectable fittings 208 along z-axis to enable self-alignment of the reconnectable fittings 208 in the corresponding conformal recess 214. In one embodiment, movements (tilting, rotation, translation) of the bushing 216 allow small movements (such as movement in x-y plane) of the reconnectable fittings 208. Such movements of the reconnectable fittings 208 are desirable for self-alignment of the reconnectable fittings 208 with the corresponding conformal recess 214.

The bushing 216 may be formed of a pliant material such as an elastomer, metal, sinter metals, or a polymer. The bushing 216 may be made from fluoropolymers such ethylene tetrafluoroethylene resins (ETFE), perfluoroalkoxyfluoroethylene resine (PFA), polytetrafluoroethylene resins (PTFE), and fluorinated ethylene propylene resins (FEP). With the properly dimensioned fluid connector device 202, an elastic member, such as the bushing 216, may not be required to provide axial force to create a seal in accordance with the invention. The force applying elements 218 positioned between the microfluidic chip 210 and the support plate 206 helps in continuously maintaining a fluid-tight seal, especially when the fluid connector experiences a range of pressures and/or temperatures.

In one embodiment, the axial force for creating the seal may be generated by moving the support plate 206 towards the microfluidic chip 210. When the support plate 206 is moved towards the microfluidic chip 210, the force applying elements 218 applies a force on the bushing 216, the force is transferred from the bushing 216 to the reconnectable fitting 208, and then to the microfluidic chip 210 to create a fluid-tight face seal at the surface area surrounding ports 220.

Figure 18:
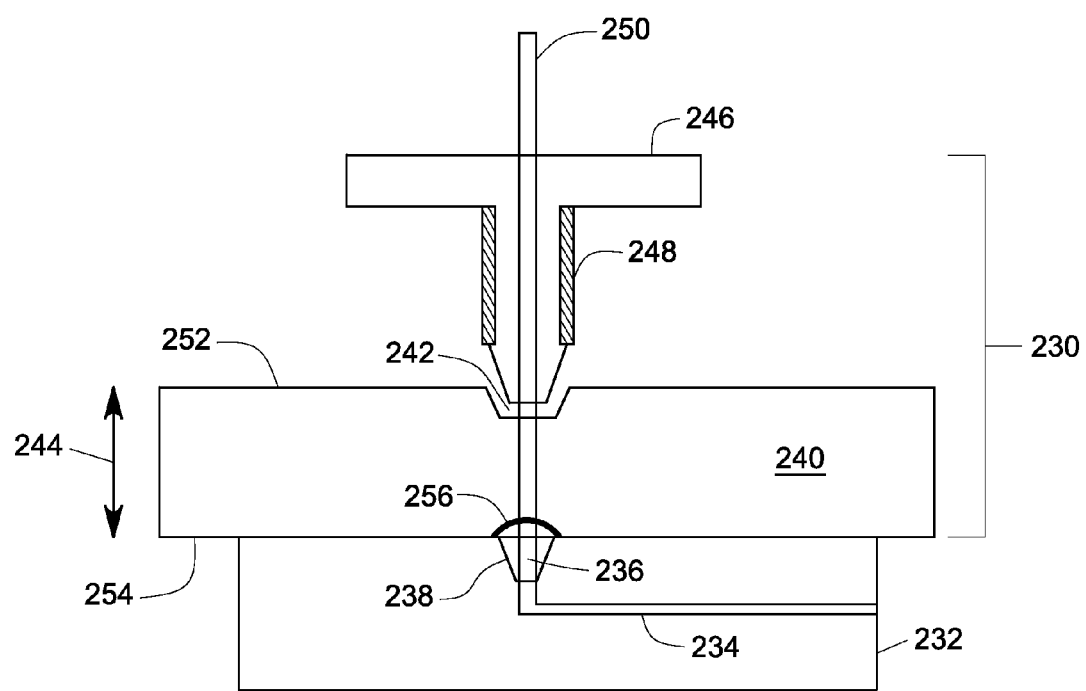
FIG. 18 is a cross sectional view of an adapter kit for introducing and/or extracting fluids from a microfluidic device, in accordance with embodiments of the present technique.

As illustrated in FIG. 18, a fluid connector device 230 may be provided in the form of an adapter kit that is retrofitted in a conventional microfluidic device 232. The adapter kit may be either reusable or disposable. The microfluidic device 232 includes a microfluidic channel 234. In the illustrated example, a tubing 236 is bonded to the microfluidic channel 234, as represented by reference numeral 238, to couple external devices to the microfluidic device 232. The fluid connector device 230 includes a coupling substrate 240 having a first surface 252 and a second surface 254. The first surface 252 includes a conformal recess 242, and the second surface includes a provision (such as a hole 256) for providing a passage for the tubing 236 to pass through the coupling substrate 240 that is disposed on the microfluidic device 232. The coupling substrate 240 may be coupled to the microfluidic device 232 using conventional bonding techniques, such as but not limited to, screwed, or chemically bonded. In one embodiment, a thickness 244 of the coupling substrate 240 may be in a range from about 500 microns to about 200 millimeters. The depth of the recess 242 may depend on the thickness between the microfluidic device 232 and the microfluidic channel 234, and the dimensions of the reconnectable fitting 246. The depth of the recess 242 may be in a range from about 500 microns to about 10 millimeters. In one embodiment, the depth of the recess 242 is smaller than or equal to the thickness 244 of the coupling substrate 240. The reconnectable fitting 246 is disposed in the recess 242. The fluid connector device 230 also employs a force applying element 248 for providing sealing force between the reconnectable fitting 246 and the coupling substrate 240. In addition, a fluid conduit 250 passes through the reconnectable fitting 246 and is coupled to the tubing 236 to provide a fluid communication between the microfluidic channel 234 and external devices using the fluid connector device 230. Although not illustrated, in one embodiment, the reconnectable fitting 246 may itself have a passageway that may be used to provide a fluid communication between the microfluidic channel 234 and external devices. In this embodiment, the fluid conduit 250 may not be required.

The reversibly connected fluid connector device 230 enables retrofitting the fluid connector device 230 in new or existing (conventional) systems, with minimal, or no alteration to the existing systems. Also, in case of failure of any of the components of the fluid connector device 230, the device can be decoupled from the microfluidic system, and either another fluid connector device, or the same fluid connector device post repair, may be coupled to the microfluidic system.

Although not illustrated, in one embodiment, the adapter kit may be used to connect reagent storage devices, transfer, and transfer and/or reactor vessels to a small-scale device such as a microfluidic device 232. In one example, a reagent storage device having a tapered end may be used as the reconnectable fitting 246

Other modifications are possible without departing from the scope of the present invention. For example, each of the reconnectable fittings may be coupled, for example, clamped, to individual support components to provide required strength to the system, and to hold the fluid connector devices in place. Advantageously, the re-connectivity and flexibility of the fluid connector device in the system requires lesser calibrations with regard to undesired environmental perturbations, such as vibrations etc.

The present invention provides several advantages, which are useful for conducting chemical analysis and synthesis using microfluidic devices. For example, the fluid connector device of the invention provides a seal which may extend across essentially the entire face of the fluid conduit, thereby minimizing fluid dead volume between the end of the fluid conduit and the port of the microfluidic device. In addition, a fluid connector of the invention provides a low cost, high pressure seal which is easily removable and reusable. Moreover, the present invention provides a self-aligning connection, which is readily adapted to individual microchip assemblies having a high fitting density.

The fluid connector device may be used with many types of microfluidic devices and with the incorporation of packaging that is easy to design and manufacture. In addition, since standard fittings (reconnectable fittings) are used, it makes it simple to adapt to other types of connection arrangements. Other advantages include easy installation, no epoxy or adhesive required, quick connection and disconnection with no tools required, small footprint, leak-tight, and high working pressures. For these reasons, the fluid connector device of this invention has the potential to become a connector standard for microfluidic devices that can be retrofitted even in the existing systems.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A fluid connector device, comprising:
   a coupling substrate comprising a conformal recess;
   a reconnectable fitting disposed in the conformal recess to provide a passageway; and
   a force applying element operatively coupled to the reconnectable fitting, or the coupling substrate, or both the reconnectable fitting and the coupling substrate to at least partially provide a sealing force between the reconnectable fitting and the coupling substrate, wherein the force applying element provides one or more degrees of freedom to the reconnectable fitting for self alignment of the reconnectable fitting and the conformal recess, wherein the force applying element comprises a spring, a gas based structure, a vacuum based structure, a fluid based structure, a hydraulic transducer, a pneumatic transducer, a magnetic transducer, an electromagnetic transducer, a thermal transducer, an electro-mechanic transducer, an electrostatic transducer, a mechanic transducer, or combinations thereof.

2. The fluid connector device of claim 1, wherein the one or more degrees of freedom comprise a translational degree of freedom, a rotational degree of freedom, or both translational and rotational degrees of freedom.

3. The fluid connector device of claim 1, wherein the reconnectable fitting is removably coupled to the conformal recess.

4. The fluid connector device of claim 3, wherein the reconnectable fitting and the conformal recess comprise a self-locking mechanism.

5. The fluid connector device of claim 1, wherein the conformal recess comprises a conical shape, a parabolic shape, a trapezoidal shape, a pyramidal shape, a hemispherical shape, a barrel shape, or combinations thereof.

6. The fluid connector device of claim 1, wherein the reconnectable fitting comprises a tapered geometry, wherein the tapered geometry comprises a conical shape, a parabolic shape, a trapezoidal shape, a pyramidal shape, a hemispherical shape, a barrel shape, or combinations thereof.

7. The fluid connector device of claim 1, wherein the conformal recess is disposed in the coupling substrate.

8. The fluid connector device of claim 1, wherein a portion of the coupling substrate, or the reconnectable fitting, or both the coupling substrate and the reconnectable fitting is elastically or plastically deformed.

9. The fluid connector device of claim 1, wherein the reconnectable fitting or the coupling substrate, or both the reconnectable fitting and the coupling substrate comprise a metal, a semiconductor, a ceramic, a polymer, or combinations thereof.

10. The fluid connector device of claim 1, wherein the reconnectable fitting or the coupling substrate, or both the reconnectable fitting and the coupling substrate comprise a polydimethylsiloxane, a copolymer of hexafluoropropylene (HFP) and vinylidene fluoride (VDF or $VF_2$), a terpolymer of tetrafluoroethylene (TFE), vinylidene fluoride (VDF), a hexafluoropropylene (HFP), a perfluoromethylvinylether (PMVE), a nitrile rubber, a thermoplastic elastomer, a polyether ether ketone (PEEK), a polypropylene, a poly(methyl methacrylate) (PMMA), a polyethelene, an olefin copolymer, a modified (ethylene-tetrafluoroethylene) fluoropolymer (ETFE), a polyetherimide, a cyclic olefin copolymer (COC), or combinations thereof.

11. The fluid connector device of claim 1, wherein a depth of the conformal recess is in a range from about 500 microns to about 10 mm.

12. The fluid connector device of claim 1, wherein at least a portion of the conformal recess, or the reconnectable fitting, or both the conformal recess and the reconnectable fitting comprise a surface modification.

13. The fluid connector device of claim 12, wherein the surface modification comprises a hard coating, a soft coating, a hydrophobic material, an adhesive, a reactively etched surface, a coated surface, a polished surface, a physical feature, or combinations thereof.

14. The fluid connector device of claim 1, wherein the reconnectable fitting comprises a plurality of passageways.

15. The fluid connector device of claim 14, wherein one or more of the plurality of passageways comprise a fluid conduit each.

16. The fluidic connector device of claim 1, further comprising a support structure coupled to the coupling substrate, or the reconnectable fitting, or both the coupling substrate and the reconnectable fitting, wherein the support structure holds the coupling substrate, or the reconnectable fitting, or both the coupling substrate and the reconnectable fitting in place.

17. The fluid connector device of claim 1, further comprising a bushing operatively coupled to the reconnectable fitting, wherein the bushing provides one or more degrees of freedom for the reconnectable fitting.

18. The fluid connector device of claim 1, wherein the coupling substrate is a device substrate comprising a microfluidic channel.

19. The fluid connector device of claim 1, wherein the coupling substrate comprises a first surface and a second surface, wherein the conformal recess is disposed on the first surface, and wherein the second surface of the coupling substrate is disposed on a device substrate.

20. The fluid connector device of claim 1, wherein a portion of the reconnectable fitting is sufficiently compressed against a part of the conformal recess to form a fluid tight seal.

21. The fluid connector device of claim 20, wherein the fluid tight seal is configured to withstand a pressure of up to about 500 bars.

22. A fluid connector assembly, comprising
   a coupling substrate having a first surface and a second surface, the coupling substrate comprising a plurality of conformal recesses on the first surface;
   a plurality of reconnectable fittings that is at least partially disposed in corresponding conformal recesses to provide passageways between a microfluidic device and the reconnectable fittings such that the reconnectable fittings are in fluidic communication with the microfluidic device, and wherein the reconnectable fittings are independent of each other;
   a plurality of force applying elements, wherein each of the plurality of force applying elements at least partially provides a sealing force between a corresponding reconnectable fitting, or the coupling substrate, or both the corresponding reconnectable fitting and the coupling substrate, and wherein the force applying element provides degrees of freedom to a corresponding reconnectable fitting along one or more of x, y or z-directions; and
   a support structure in operative association with the plurality of force applying elements.

23. The fluid connector assembly of claim 22, wherein the support structure comprises a planar support plate, a L-shaped structure, a U-shaped structure, a clamp stand, or combinations thereof.

24. The fluid connector assembly 22, further comprising a bushing disposed on the plurality of reconnectable fittings.

25. An adapter kit for introducing and/or extracting fluids from a microfluidic device, the adapter kit comprising:

a coupling substrate having a first surface and a second surface, wherein the first surface comprises a conformal recess;

a plurality of reconnectable fittings disposed in corresponding recesses to provide a first passageway for one or more fluid conduits, wherein the reconnectable fittings are independent of each other; and a plurality of force applying elements, wherein each of the plurality of force applying elements at least partially provides a sealing force between a corresponding reconnectable fitting, or the coupling substrate, or both the corresponding reconnectable fitting and the coupling substrate, and wherein at least one of the plurality of force applying elements, corresponding reconnectable fittings, and the coupling substrate comprises one or more degrees of freedom for self alignment of the reconnectable fittings and a corresponding conformal recesses, wherein each of the plurality of force applying elements comprises a spring, a gas based structure, a vacuum based structure, a fluid based structure, a hydraulic transducer, a pneumatic transducer, a magnetic transducer, an electromagnetic transducer, a thermal transducer, an electro-mechanic transducer, an electrostatic transducer, a mechanic transducer, or combinations thereof.

26. The adapter kit of claim 25, wherein the second surface of the coupling substrate comprises a provision for a tubing.

* * * * *